United States Patent [19]

Stevens et al.

[11] Patent Number: 5,034,184
[45] Date of Patent: Jul. 23, 1991

[54] SPEED CONTROL WITH END CUSHION FOR HIGH SPEED AIR CYLINDER

[75] Inventors: Wayne W. Stevens; Charles W. Solbrig, both of Idaho Falls, Id.

[73] Assignee: The United States of America as represented by the United States Department of Energy, Washington, D.C.

[21] Appl. No.: 368,637

[22] Filed: Jun. 20, 1989

[51] Int. Cl.⁵ .............................................. G21C 7/20
[52] U.S. Cl. ..................................... 376/231; 376/234
[58] Field of Search .......................... 91/405; 92/85 B; 188/284, 297; 376/230, 231, 234

[56] References Cited

U.S. PATENT DOCUMENTS

| 3,406,093 | 10/1968 | De Paratesi et al. | 376/234 |
| 3,980,519 | 9/1976 | Taft | 376/234 |
| 4,487,739 | 12/1984 | Thatcher et al. | 376/234 |

FOREIGN PATENT DOCUMENTS 1218079  6/1966  Fed. Rep. of Germany ...... 376/234

OTHER PUBLICATIONS

MacFarlane et al, Hazards Summary Report on the Transient Reactor Test Facility (Treat), ANL-5923, Oct. 1958, pp. 18-22.

Primary Examiner—Stephen C. Bentley
Attorney, Agent, or Firm—Helen S. Cordell; John M. Albrecht; William R. Moser

[57] ABSTRACT

A high speed air cylinder in which the longitudinal movement of the piston within the air cylinder tube is controlled by pressurizing the air cylinder tube on the accelerating side of the piston and releasing pressure at a controlled rate on the decelerating side of the piston. The invention also includes a method for determining the pressure required on both the accelerating and decelerating sides of the piston to move the piston with a given load through a predetermined distance at the desired velocity, bringing the piston to rest safely without piston bounce at the end of its complete stroke.

7 Claims, 4 Drawing Sheets

SPEED CONTROL WITH END CUSHION FOR HIGH SPEED AIR CYLINDER

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to an apparatus for nuclear reactors, particularly to an apparatus for the acceleration and deceleration of the movement of a neutron absorbing control element of a nuclear reactor during its scram stroke.

In many types of nuclear reactors the output and uniform fuel consumption of the reactors is controlled by inserting rods bearing a neutron absorbing material thereon into the reactor core. Shutdown or scram may be effected by releasing the control rods, and permitting them to fall with the force of gravity into the reactor core.

In an emergency the control rods must enter into the reactor core sufficiently rapidly to effect an immediate power shut off, and the movement of the control rods must be slowed and stopped at the end of their strokes to prevent damage to the rods and to the core. Prior art methods such as those disclosed in U.S. Pat. No. 3,980,519, issued Sept. 14, 1976, to Taft, and U.S. Pat. No. 4,487,739 issued Dec. 11, 1984, to Thatcher et.al. have been devised to damp the motion of the free falling control rods prior to the point of impact.

It is an object of this invention to provide a reliable and fast acting system for the insertion of control rods into a reactor core including both propulsion and damping of control rod movement.

In the accomplishment of the foregoing object, it is another important object of this invention to provide a method for determining the accelerating pressure required to cause rapid insertion of a control rod as well as the decelerating pressure required to prevent damage to the control rod mechanism.

It is another important object of this invention to provide a method for determining the rate at which decelerating pressure should be relieved to permit the control rod to move through a full stroke and come to rest safely without bouncing.

It is a further object of this invention to present an improvement to a nuclear reactor control rod assembly which controls the movement of the control element throughout the scram stroke.

Additional objects, advantages and novel features of the invention will become apparent to those skilled in the art upon examination of the following and by practice of the invention.

SUMMARY OF THE INVENTION

To achieve the foregoing and other objects, this invention comprises a high speed air cylinder in which the longitudinal movement of the piston within the air cylinder tube is controlled by pressurizing the air cylinder tube on the accelerating side of the piston and releasing pressure at a controlled rate on the decelerating side of the piston. The invention also includes a method for determining the pressure required on both the accelerating and decelerating sides of the piston to move the piston with a given load through a predetermined distance at the desired velocity, bringing the piston to rest safely without piston bounce at the end of its complete stroke.

BRIEF DESCRIPTION OF THE DRAWINGS

The present invention is illustrated in the accompanying drawings and graph.

DETAILED DESCRIPTION OF THE INVENTION

The TREAT nuclear reactor at Argonne National Laboratory, a research reactor designed to perform transient reactor power experiments, has four control rod drive assemblies with a moving mass of 278 lbs. each, and four control rod assemblies with a moving mass of 128 lbs. each. Each rod must be moved through a five foot stroke into the reactor core to accomplish shutdown. To meet technical specification requirements, shutdown of the reactor at the end of a transient must be accomplished within 0.35 seconds.

Figure 1:
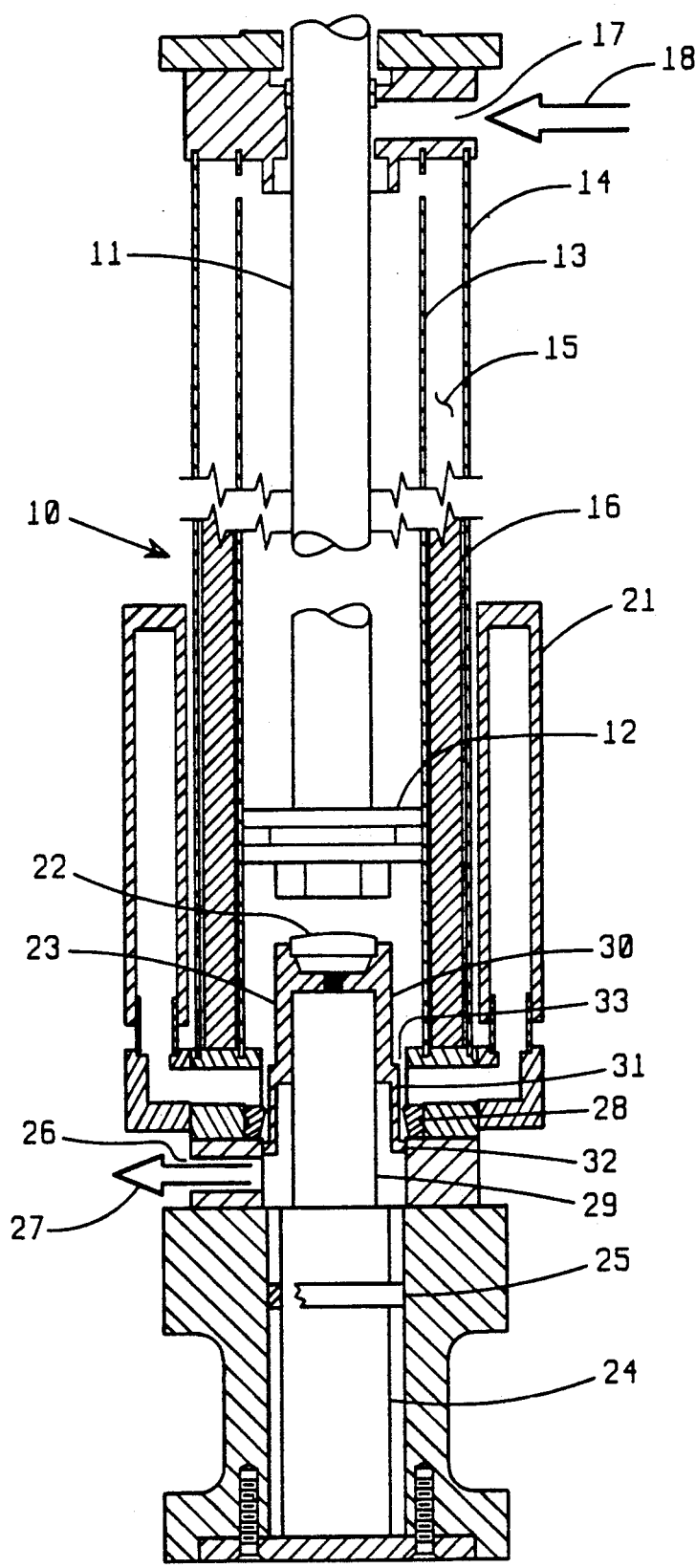
FIG. 1 is a schematic of the air cylinder which is the subject of the present invention.

In the preferred embodiment as depicted in FIG. 1, high speed air cylinder 10 of the present invention provides both propulsion and damping of the longitudinal movement of each TREAT reactor control rod during shutdown. Referring to FIG. 1, on the accelerating side of piston 12, the air cylinder 10 is comprised of piston rod 11, piston 12, inner cylinder tube 13, outer cylinder tube 14, accumulator 15, spacer 16, and supply port 17.

Piston rod 11 is connected to piston 12 which is prelubricated and movable longitudinally within inner cylinder tube 13. (Not shown is the mechanism which connects air cylinder 10 to the control rod or the mechanical drive which withdraws the control rod attached to piston rod 11 from the reactor core.) Outer cylinder tube 14 surrounds inner cylinder tube 13 and forms an annulus or accumulator 15 concentric with and in fluid communication with inner cylinder tube 13 and supply port 17. During pressurization of the accelerating side of air cylinder 10, high pressure air flows in the direction of arrow 18 through supply port 17 into inner cylinder tube 13 and then to accumulator 15.

The volume of accumulator 15 is determined by the method of the invention to be described below. During the assembly of air cylinder 10, cylindrical aluminum spacer 16 concentric with inner cylinder tube 13 is inserted in accumulator 15, to fill a portion of accumulator 15 and to reduce its volume to the desired volume.

Still referring to FIG. 1, the decelerating side of air cylinder 10 is sealed from the accelerating side within inner cylinder 13 by piston 12. The decelerating side of air cylinder 10 is comprised of air compression tube 21, bumper 22, end cap 23, shock absorber 24, support ring 25, exhaust port 26, orifice ring 28 and shock absorber rod 29.

Air compression tube 21 is in fluid communication with inner cylinder tube 13 through radial port 33. A compressible fluid shock absorber 24 and bumper 22 are integrally mounted with end cap 23, and at the full down position of piston 12, bumper 22 abuts piston 12 within inner cylinder 13. Shock absorber 24 is supported laterally by support ring 25, and can be extended, exposing shock absorber rod 29.

End cap 23 is cylindrical in cross-section and is stepped, having three different diameter portions the dimensions of which are determined by the method of the invention to be described below. When end cap 23 is positioned with bumper 22, the smallest diameter portion 30 of end cap 23 is nearest the piston 12, the medium diameter portion 31 of end cap 23 is next, and the largest diameter portion 32 of end cap 23 is farthest from the piston 12.

As shown in FIG. 1, when the shock absorber 24 is in the fully extended position the largest diameter portion 32 of end cap 23 blocks fluid communication through the opening defined by orifice ring 28 from air compression tube 21 to and through exhaust port 26 in the direction of arrow 27.

Figure 2:
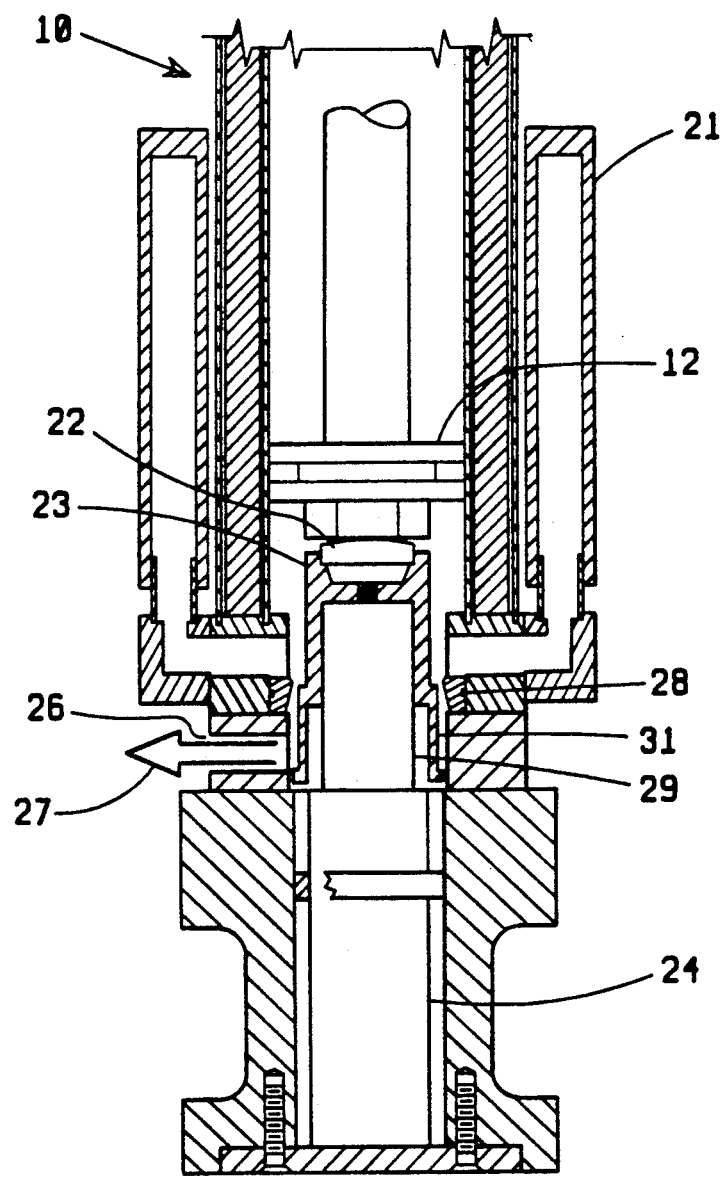
FIG. 2 is a schematic of the air cylinder detailing the decelerating side of the piston, showing the piston impacting a bumper on the shock absorber so that further travel would open an orifice and the decelerating fluid would be exhausted at a controlled rate.
Figure 3:
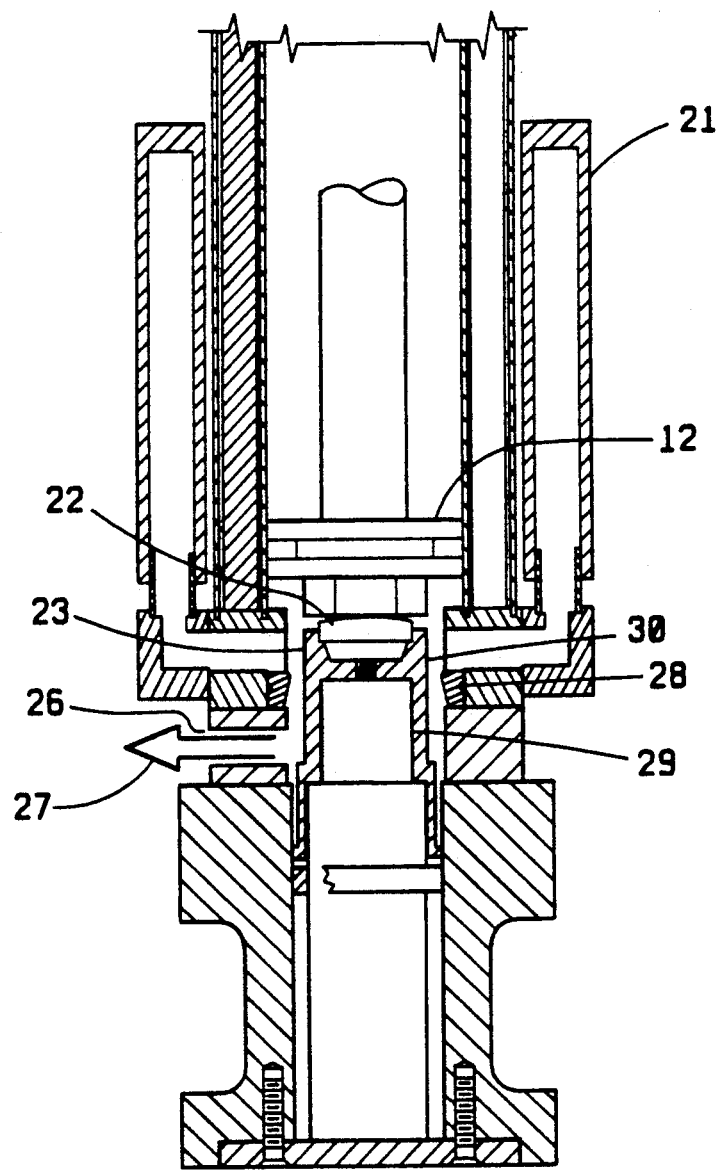
FIG. 3 is a schematic of the air cylinder detailing the decelerating side of the piston, showing the shock absorber fully compressed and the path through the orifice unrestricted.

FIGS. 2 and 3 depict the decelerating side of air cylinder 10 with end cap 23 in two respective positions, permitting escape of air from compression tube 21 through exhaust port 26 at varying flow rates.

FIG. 2 is a section view of the decelerating side of air cylinder 10 showing piston 12 impacting bumper 22 and end cap 23 onto shock absorber 24. In FIG. 2 shock absorber rod 29 is partially compressed. Piston 12 has impacted bumper 22 and moved end cap 23 so that shock absorber 24 is two inches from full end travel. Medium diameter portion 31 of end cap 23 has moved longitudinally and orifice ring 28 encircles the medium diameter portion 31 of end cap 23. With any further travel of piston 12, air will be exhausted from compression tube 21 through the opening between orifice ring 28 and end cap 23 and then through exhaust port 26 in the direction of arrow 27.

FIG. 3 is a section view of the decelerating side of the air cylinder 10 showing the elements subsequent to the FIG. 2 position. In FIG. 3 shock absorber rod 29 has reached full end travel, orifice ring 28 encircles the smallest diameter portion 30 of end cap 23, and the opening between orifice ring 28 and end cap 23 is at its maximum. Air at high pressure in compression tube 21 has been exhausted to the atmosphere through exhaust port 26 in the direction of arrow 27, and air in compression tube 21 is now at atmospheric pressure.

Those skilled in the art will recognize that alternate embodiments of the current invention may provide different means for sizing and sealing the opening between the end cap 23 and orifice ring 28. The progression of sizing may also be varied to suit the load and speed requirements of the embodiment.

Figure 4:
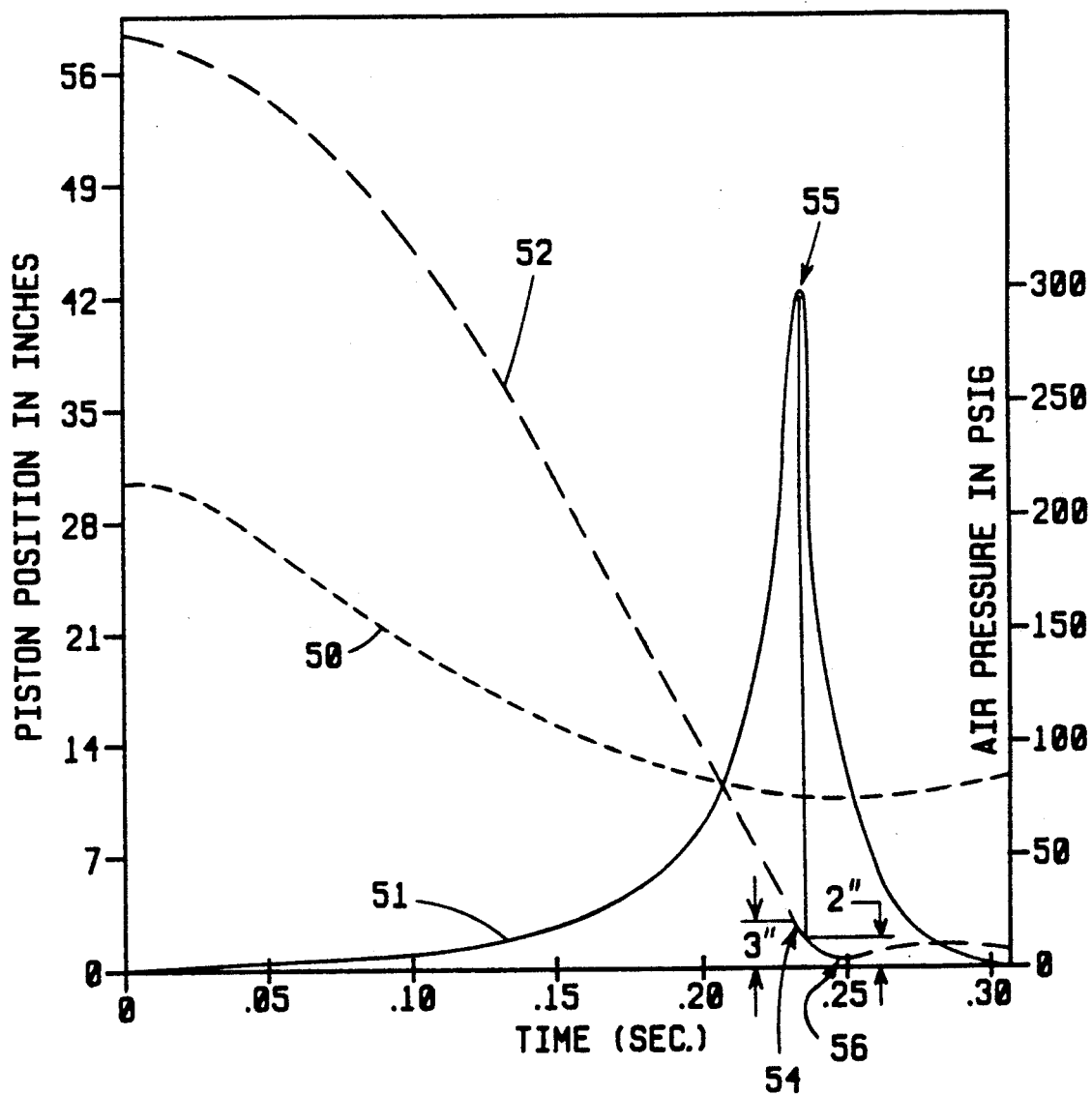
FIG. 4 is a graphical depiction of the motion of the piston within the air cylinder, showing the changes in air pressure on the accelerating and decelerating sides of the piston at each position in the piston's full stroke.

FIG. 4 is a graphical depiction of the motion of the piston within the air cylinder of the preferred embodiment, showing the changes in air pressure on the accelerating and decelerating sides of the piston at each position in the piston's full stroke.

In the preferred embodiment, a control rod weighing 278 lbs. is moved through a full stroke of 60 inches. Initially the pressure on the accelerating side of the piston is 220 psig, as depicted by dash line 50. Initially the pressure on the decelerating side of the piston is 0 psig as depicted by solid line 51. As the piston moves from the full out position at a height of 60 inches to the full in position at a height of 0 inches, the accelerating pressure decreases and the decelerating pressure increases. At a piston height of approximately 13 inches the pressure on the accelerating side of the piston decreases below that of the pressure on the decelerating side but momentum keeps the piston moving downward, at which point the decelerating pressure increases rapidly to provide a very strong retarding force.

The combination of the pressure on the accelerating side of the piston and the pressure on the decelerating side of the piston causes the desirable piston motion shown in FIG. 4 by dashed line 52. Greatest acceleration occurs during the first two feet of motion, enabling rapid control rod insertion and reactor shutdown. In the preferred embodiment an almost 300 pound mass is moved vertically downward 60 inches at speeds up to 325 inches per second, accomplishing shutdown within the required 0.35 seconds.

Shortly after mid-stroke the increased pressure of the trapped air volume on the decelerating side of the piston causes the piston to slow. When the piston is within three inches of full end travel, at point 54 in FIG. 4, the piston contacts the bumper and end cap. At point 55 there is an opening between the end cap and the orifice ring. When the piston is less than two inches from full end travel, after point 56 in FIG. 4, the smallest diameter portion of the end cap is encircled by the orifice ring and the air on the decelerating side of the air cylinder is rapidly approaching atmospheric pressure. At the end of the stroke bounce is avoided because the pressurized air is completely exhausted. The remaining energy of the piston is absorbed by a compressible fluid shock absorber and the piston is brought safely to rest.

Included in the current invention is a method for determining the following factors for a given load and desired distance of travel: the volume of the accumulator on the accelerating side of the piston, the volume of the compression tube on the decelerating side of the piston, the initial pressure required in both volumes to enable full exhaust of pressurized air at the end of a full stroke thereby avoiding piston bounce, and the optimum time to open the orifice formed by the end cap and the orifice ring.

The following equation may be used as a design tool to satisfy the above design requirements:

$$V^2 = \frac{2}{m}\left\{ \frac{-P_2 x_1^n A_2}{n-1}\left(\frac{1}{x^{n-1}} - \frac{1}{x_1^{n-1}}\right) - \frac{P_3(x_2 + x_3)^n A_3}{n-1}\left(\frac{1}{(x_T - x)^{n-1}} - \frac{1}{(x_2 + x_3)^{n-1}}\right) + (P_o A_1 + mg)(x - x_1)\right\}$$

where V = is the velocity.
x = position of piston. $x = x_1$ is starting, $x = x_1 + x_2$ is ending.
$x_1 = v_1/v_2$.
$v_1$ = volume above the highest point of piston travel.
$A_2$ = area of topside of piston.
$x_2 = v_2/A_3$, the distance over which piston travels.
$V_2$ = volume swept out by the piston.

$A_3$ = area of the bottom of the piston.
$x_3 = v_3/A_3$.
$x_T = x_1 + x_2 + x_3$.
$v_3$ = volume below the lowest point of piston travel.
m = mass being moved (piston plus control rod).
$p_a$ = atmospheric pressure.
$p_2$ = initial pressure on topside of piston.
$p_3$ = initial pressure on bottom side of piston.
n = polytropic coefficient for particular gas.
g = gravitational constant, 32.2 ft/sec$^2$ The impact velocity of a particular design may be obtained by substituting for x the quantity $(x_1 + x_2)$. Once a design is established, the impact velocity for a drop from any height is evaluated, the position and value of the maximum impact velocity and the minimum upper cylinder surge pressure to prevent piston bounce are obtained from this equation. The time of piston travel is obtained by integrating 1/v with respect to distance.

Those skilled in the art will recognize that the current invention may also be used for movement of a load in a direction against gravity, or perpendicular to gravity, as with the movement of heavy doors or equipment. Because gravity is a very small force compared to the pressure forces in the system this scram system would also function in a gravity free environment, as with space reactors. Mathematically, the gravitational constant term in the above design equation may be modified to be either negative or zero.

In addition, this invention can be used to effect the motion of two pistons moving in opposite directions. Further, the invention may be used to determine the pressure of a compressible gas which is used to accelerate or decelerate a hydraulic fluid which in turn moves a load, by calculating the volumes and initial pressures necessary to move the hydraulic fluid as well as the load.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. In a control assembly for a nuclear reactor having a piston within a cylinder controlling the longitudinal movement of a control element during insertion into a reactor core, the improvement comprising:
   an accelerating fluid of predetermined volume and pressure propelling said piston, causing rapid insertion of said control element,
   a decelerating fluid of decreasing volume and pressure decelerating the movement of said piston, and
   absorbing means arresting the longitudinal movement of said control element at the point of full insertion of said control element into said reactor core,
   wherein said decelerating fluid is exhausted through an orifice which is adjustable to control the rate of exhaust, and wherein said orifice is adjusted by means of an end cap of varying diameter which is operatively connected with said absorbing means and is movable longitudinally in said cylinder.

2. The control assembly improvement defined in claim 1, wherein the longitudinal movement of said absorbing means and end cap causes said orifice to open or close, increasing or decreasing, respectively, the rate of exhaust of said decelerating fluid.

3. The control assembly improvement defined in claim 2, wherein said decelerating fluid is contained within said cylinder tube surrounding said piston and within a compression tube in fluid communication with the interior of said cylinder tube.

4. The control assembly improvement defined in claim 3, where said accelerating fluid is air.

5. The control assembly improvement defined in claim 3, wherein said decelerating fluid is air.

6. The control assembly improvement defined in claim 3, wherein said accelerating fluid is a compressible gas.

7. The control assembly improvement defined in claim 3, wherein said decelerating fluid is a compressible gas.

* * * * *